Nov. 9, 1954  P. TROMBETTA  2,693,866
ELECTROMAGNETICALLY CONTROLLED BRAKE
Filed July 21, 1950  6 Sheets-Sheet 1

INVENTOR.
Panfilo Trombetta
BY
Mason, Kolehmainen, Rathburn & Wyss
Att'ys

Nov. 9, 1954    P. TROMBETTA    2,693,866
ELECTROMAGNETICALLY CONTROLLED BRAKE
Filed July 21, 1950    6 Sheets-Sheet 2

INVENTOR.
Panfilo Trombetta
BY
Mason, Kolehmainen, Rathburn & Wyss
Attys

Nov. 9, 1954 P. TROMBETTA 2,693,866
ELECTROMAGNETICALLY CONTROLLED BRAKE
Filed July 21, 1950 6 Sheets-Sheet 3
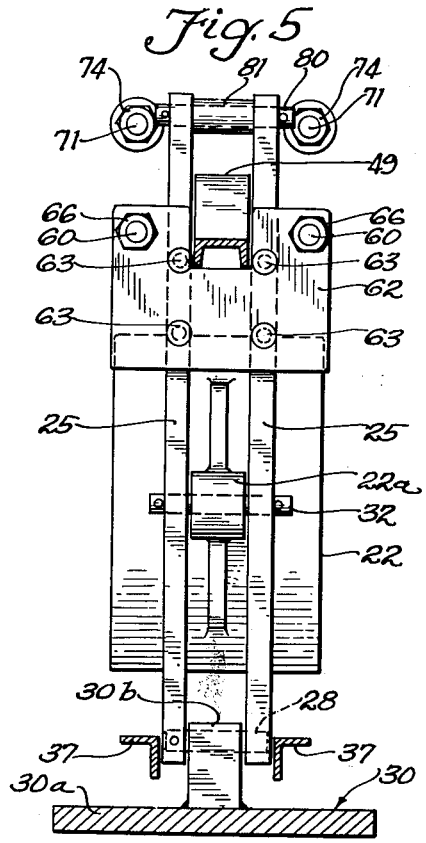
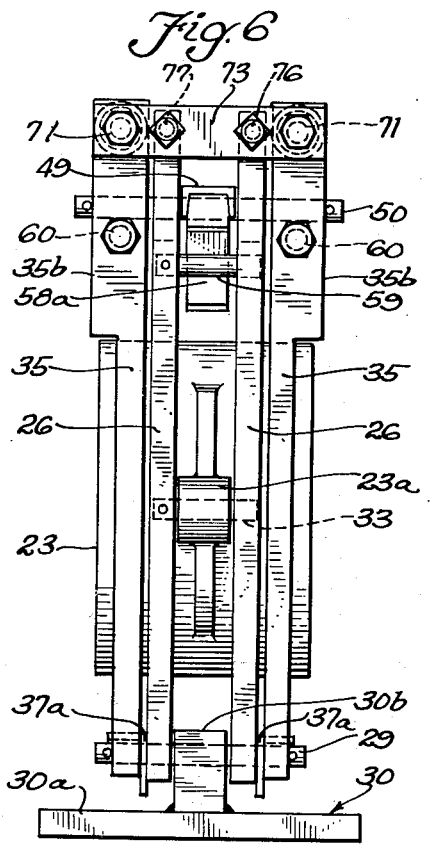
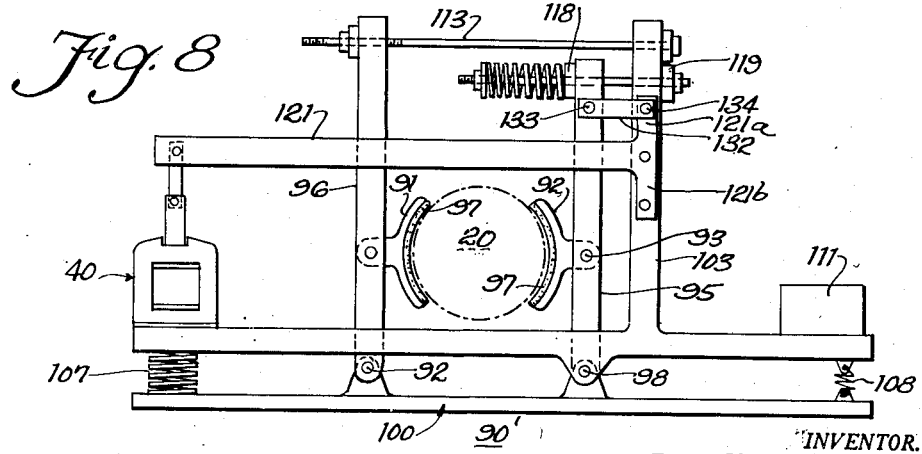
INVENTOR.
Panfilo Trombetta
BY
Mason, Kolehmainen, Rathburn & Wyss
Att'ys

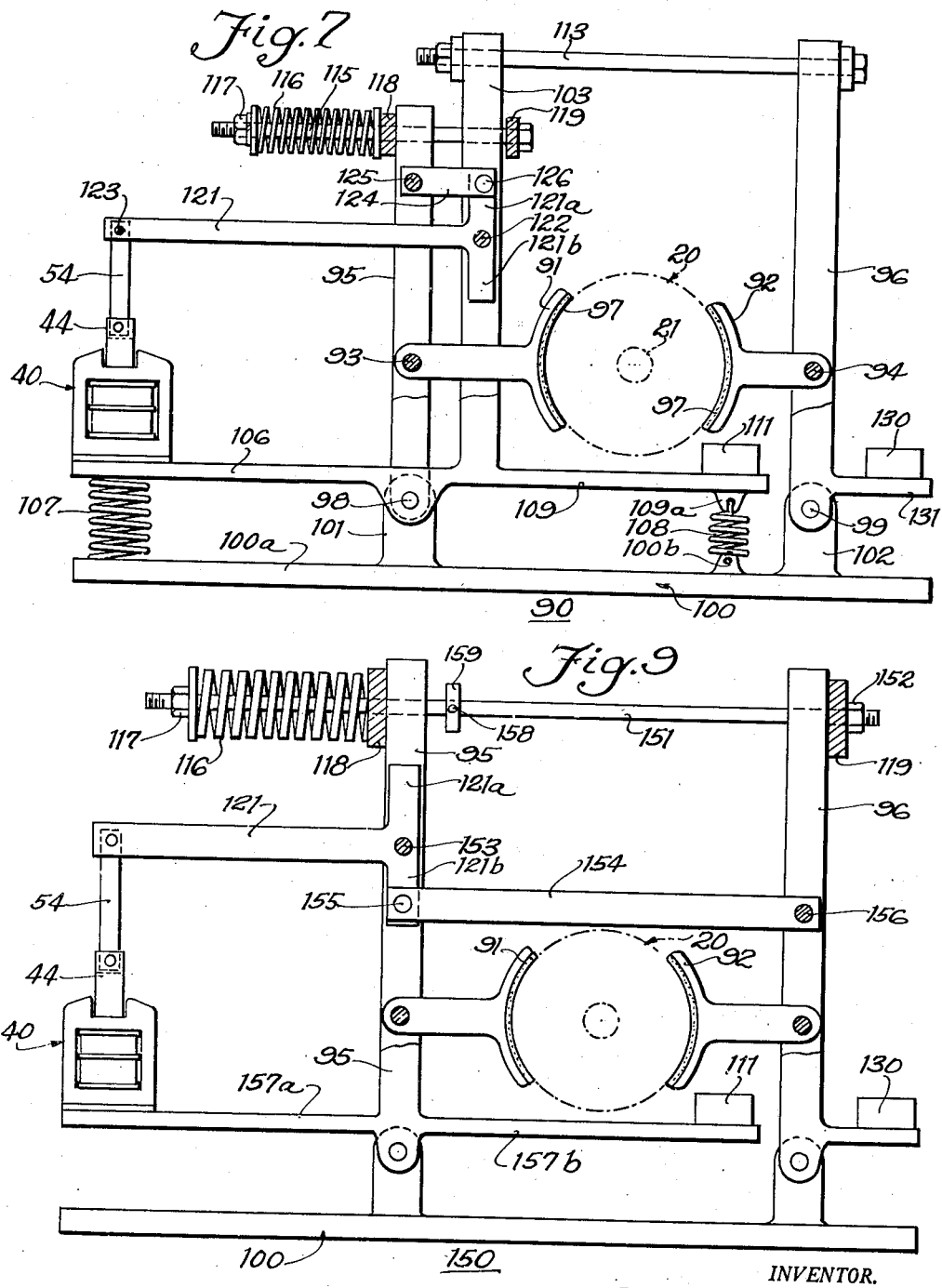

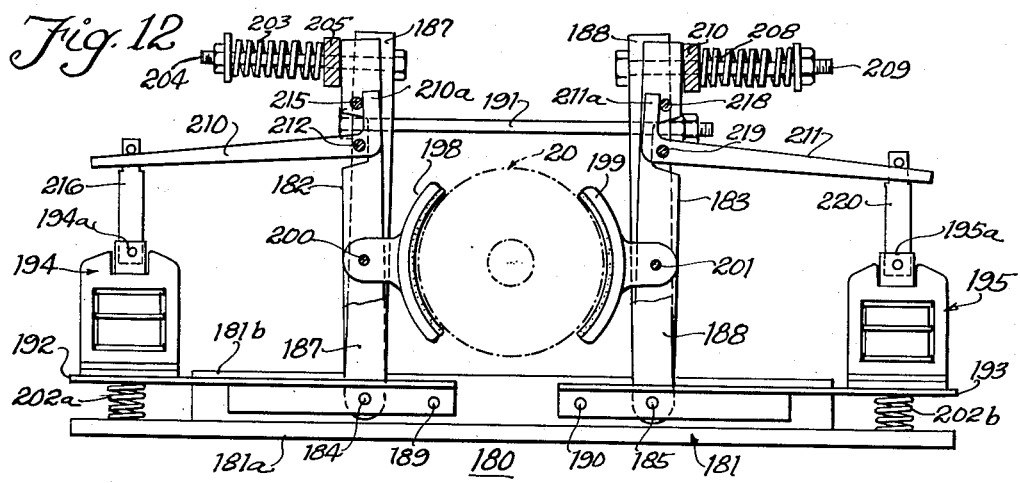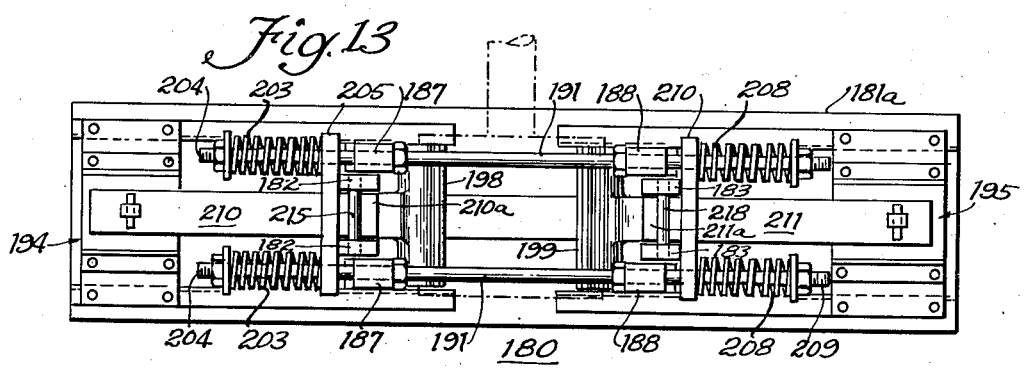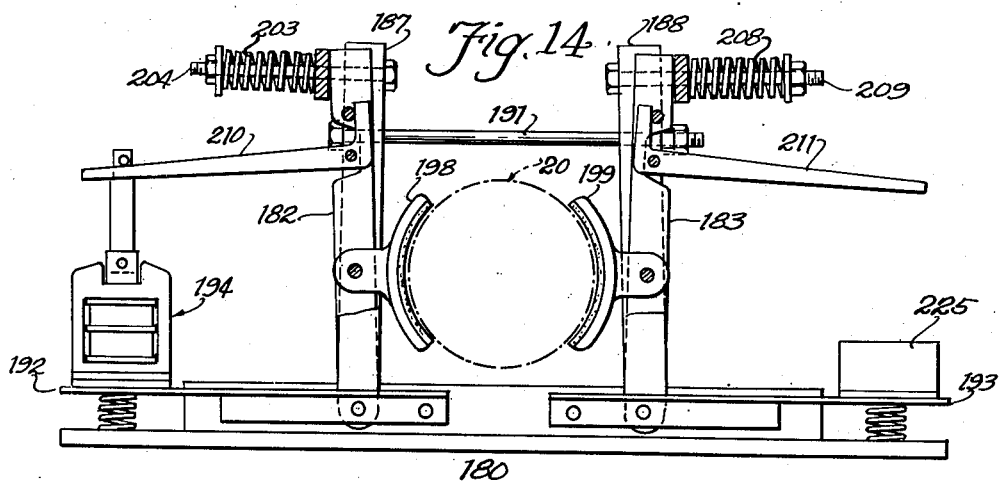

United States Patent Office 2,693,866
Patented Nov. 9, 1954

2,693,866
ELECTROMAGNETICALLY CONTROLLED BRAKE

Panfilo Trombetta, Milwaukee, Wis.

Application July 21, 1950, Serial No. 175,250

31 Claims. (Cl. 188—171)

The present invention relates to electromagnetically controlled brakes and in particular to the two well-known types of electromagnetically controlled brakes designated specifically as "spring-set electromagnetically-released" and "electromagnetically-set spring-released." Specifically, the present invention is a continuation-in-part of copending Trombetta applications, Serial Nos. 522,103, filed February 12, 1944, and 106,089, filed July 21, 1949, both applications now abandoned.

Electromagnetically controlled brakes are extensively employed in industrial applications of all sorts. They are, for example, almost universally employed in connection with elevators, hoists, and the like. For the particular applications mentioned, the spring-set electromagnetically-released type of brake is generally employed in order to make use of its so-called "fail safe" feature. By that is meant that in connection with an elevator or a hoist operated by an electric motor, if for any reason power should fail, the elevator or hoisting block would fall unless a "fail safe" electromagnetically controlled brake is employed whereby when the power goes off, the brake automatically sets itself. Thus, for such applications, the brake is applied by energy storage means such as springs and when the operator desires to manipulate the hoist or elevator, electromagnetic means in the form of a solenoid is energized to release the brake and permit the elevator or hoist to function.

There are other applications, however, where an electromagnetically set spring-released brake is more satisfactory from a "fail safe" standpoint. In moving carriage arrangements, for example, an endless chain may be continuously driven for guiding the movement of a carriage. The carriage, in turn, may be supported by sprockets engaging the chain. As long as the sprocket can rotate, the carriage will not move with movement of the chain since this is taken care of by rotation of the sprocket itself. If, however, a brake is applied to prevent the sprocket from rotating, then the sprocket must move with the chain with the resultant movement of the carriage. In the event of power failure, it is desirable to stop movement of the carriage and this can only occur upon release of the brake. Hence, a "fail safe" arrangement for this type of application in the event power goes off, requires release of the brake and as a result, an electromagnetically-set spring-released type would be employed.

In electromagnetically controlled brakes employed heretofore, the conventional construction comprised a pair of brake shoe supporting arms or levers pivotally mounted on a base together with an operating solenoid for controlling these levers. In addition, spring means were employed to either set or release the brake, depending upon the particular type involved. With this ordinary construction employed heretofore, the operating solenoid, when energized imparted a reactive moment to one of the brake shoes, either in a brake releasing direction or in a brake applying direction which in turn removed or applied a torque to the brakedrum. Unless equalizing means are used to equalize the releasing action, there would be an unbalanced torque applied to the brakedrum when the brake should be released. It would be desirable to provide an arrangement in which equalizing means could be completely eliminated and yet wherein all brake forces are balanced at all times.

Such electromagnetically controlled brake systems generally comprise three basic parts: (1) a torque absorbing system, (2) a torque controlling system, and (3) a torque adjusting system. The torque absorbing system obviously includes the friction brake shoes for engaging the brakedrum, together with the means which support these brake shoes for relative movement toward and away from the brakedrum. The torque controlling system may be either a torque releasing or a torque applying arrangement or, as will become apparent as the following description proceeds, simultaneously a torque releasing and a torque applying system. In such electromagnetically controlled brakes, the torque controlling system comprises the solenoid and lever system associated therewith. The torque adjusting system comprises the means for varying the pressure on the brake shoes involving means for adjustment of the spring force, and associated means.

In many applications it is essential that the electromagnetically controlled brake arrangements be substantially failure proof in operation. For example, in dredges or hoists, failure of the solenoid of an electromagnetically controlled brake may render the entire device inoperative until the brake is repaired. It would be desirable to provide an arrangement whereby if the solenoid on such a device burned out, that the brake could still be operated.

It is an object of the present invention to provide a new and improved electromagnetically controlled brake.

It is a further object of the present invention to provide an electromagnetically controlled brake which permits the equalized release of the brake shoes from the brakedrum without the use of any equalizing means.

It is another object of the present invention to provide an electromagnetically controlled brake comprising a pair of closed action-reaction circuits statically balanced to eliminate any unbalanced moments which will disturb the symmetrical operation of each brake shoe with relation to the brakedrum.

It is another object of the present invention to provide a new and improved electromagnetically controlled brake which is of sturdy construction, simple and inexpensive to manufacture, foolproof in operation and which will give long years of satisfactory service.

It is a further object of the present invention to provide an electromagnetically controlled brake which requires less adjusting than brakes heretofore employed.

Still another object of the present invention is the provision of an improved electromagnetically controlled brake comprising a pair of closed action-reaction circuits related at a common nodal axis.

A still further object of the present invention resides in the provision of an improved electromagnetically controlled brake of general application which may readily be converted from a spring-set electromagnetically-released device to an electromagnetically-set spring-released device and in which the static forces are balanced and the operation of the torque absorbing system is free from external reactions.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

Fig. 5 is a sectional view taken on line 5—5 of Fig. 1;

Fig. 6 is an end view looking in the direction of the arrows 6—6 of Fig. 1;

Fig. 7 is a somewhat schematic elevational view similar to Fig. 1 showing a spring-set electromagnetically-released brake illustrating a modification of the present invention;

Fig. 8 is a view similar to Fig. 7 showing an electromagnetically-set spring-released brake embodying the present invention;

Fig. 9 is a schematic elevational view illustrating still another embodiment of the present invention including an electromagnetically-released spring-set brake;

Fig. 12 is an elevational view illustrating still another modification of the present invention;

Fig. 13 is a top plan view of Fig. 12, and;

Fig. 14 is an elevational view of Fig. 12 showing one solenoid removed for repair purposes and replaced by a dummy unit.

Figure 1:
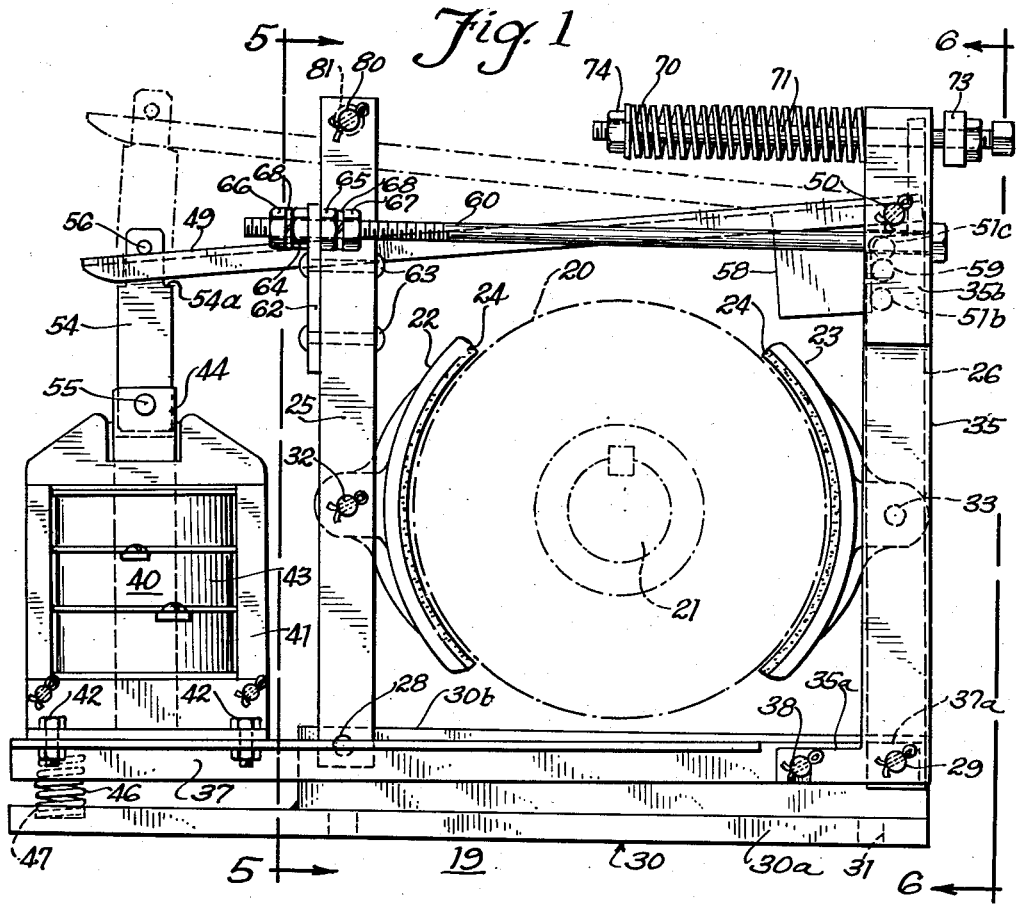
Fig. 1 is an elevational view of one embodiment of the present invention showing a spring-set electromagnetically-released type of brake with the brake shown in the released condition.
Figure 2:
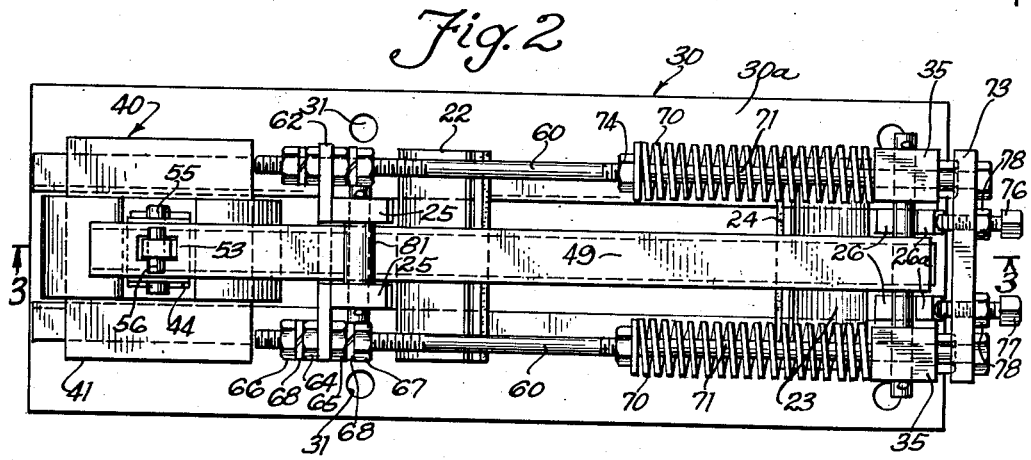
Fig. 2 is a top plan view of the arrangement shown in Fig. 1.

The present invention is primarily concerned with an electromagnetic brake comprising links and levers arranged in a pair of closed action-reaction oscillating systems which are related at a common nodal point. These two oscillating systems include a torque absorbing system and a torque controlling system. These two systems further include a common torque adjusting system. The electromagnet is a portion of the torque controlling system which is self-contained and connected to the torque absorbing system through a "nodal" point common to both in such a way that the movement of the moving element of the solenoid is transmitted to the torque absorbing system without disturbing the torque absorbing system's symmetrical position with respect to the brake wheel.

Referring now to the drawings and specifically to Figs. 1 to 6 of the drawings, there is illustrated what may be considered to be the preferred embodiment of the invention as applied to an electromagnetically-released spring-set type of brake generally indicated at 19. As illustrated, the brake comprises the conventional brakedrum or brake wheel generally designated at 20 conventionally keyed or otherwise secured to the shaft 21 of a prime mover, such for example, as an electric motor, not shown. This prime mover or electric motor may be used to control an elevator, a hoist, or other suitable object which it is desired further to control by an electromagnetically controlled brake described hereinafter. For the purpose of frictionally controlling the brakedrum or wheel 20, there are provided a pair of brake shoes designated respectively as 22 and 23 which have the conventional concave surfaces for engaging the periphery of the brakedrum 20. It will be understood that the brake shoes 22 and 23 might equally well have convex surfaces for application to the internal surface of a suitable brakedrum. Each brake shoe 22 and 23 is provided with the conventional brake lining designated by the reference numeral 24.

For the purpose of supporting the brake shoes 22 and 23 in an appropriate position adjacent the brakedrum 20, there are provided two pairs of brake shoe supporting arms 25 and 26 generally disposed in a vertical direction for the particular configuration indicated in Figs. 1 to 6 of the drawings. These pairs of brake shoe supporting arms 25 and 26 are pivoted respectively on pivot pins 28 and 29 to a suitable supporting base 30. As indicated, the base 30 is of somewhat T-shaped configuration including a main base portion 30a and the upwardly extending portion 30b. It should be understood that the base 30 may comprise a unitary casting, or as illustrated, may comprise separate elements 30a and 30b suitably welded or otherwise secured together to provide the integral construction indicated. Preferably, the portion 30a of the base member 30 is provided with suitable openings 31 to accommodate suitable fastening bolts to mount this electromagnetically controlled brake in position in any particular application thereof. The upwardly extending portion 30b provides the support for receiving the pivot pins 28 and 29, the pair of lever arms 25 being disposed on opposite sides of one end of the element 30b and the pair of lever arms 26 being disposed on opposite sides of the other end of the element 30b as is clearly shown in Fig. 4 of the drawings. The brake shoes 22 and 23 are each provided with an integral projection 22a and 23a respectively extending between the lever arms 25 and 26 whereby the brake shoes may be pivotally supported as indicated by the pivot pins 32 and 33. Suitable cotter keys or similar devices will, of course, maintain the pivot pins 28, 29, 32 and 33 in position. The friction brake shoes 22 and 23, the arms 25 and 26 and the part of base member 30 which holds them together comprise the torque absorbing system of the brake referred to above since, as the name implies, this system resists the torsional moments of the shaft 21 and brakedrum 20.

The torque controlling system which for the spring-set electromagnetically-released brake shown in Fig. 1 is effectively a torque releasing system, comprises a pair of auxiliary arms 35 mounted on the pivot pin 29 outside the brake shoe supporting arms 26. As illustrated in the drawings, the arms 35 are effectively of L-shape in that they include projections 35a at the lower ends thereof extending substantially at right angles to the main arm portions.

In order to support the electromagnetic means, to be described hereinafter, there are provided a pair of substantially horizontally disposed supporting arms 37 which are illustrated as angle iron members, one disposed on either side of the upstanding portion 30b of the base 30. Each of the supporting arms 37 has one flange of the angle iron portion cut away adjacent the pivot pin 29 so as to leave only the portion 37a which is disposed between the arms 26 and 35 and is pivoted on the pivot pin 29. Effectively, the supporting arms 37 and the auxiliary arms 35 are united as an integral structure by virtue of a pin 38 extending through aligned openings in the projections 35a and the portions 37a of the angle supports 37. Since this pin also passes through the upstanding portion 30b of the base 30, the former is provided with an enlarged opening 39 through which the pin 38 extends, which opening permits limited movement of the auxiliary arms 35 and the supporting angle iron arms 37 relative to the base 30. If desired, the openings in the extensions 35a of the arms 35 may be notches opening toward the bottom as indicated in Fig. 1 whereby the supporting arms 37 are effectively integral with the auxiliary arms 35 for only one direction of pivotal movement with reference to pivot point 29. Also, if desired, it will be understood that the base 30 may have two upwardly extending projections for receiving the pivot pins 28 and 29, whereupon the intermediate portion of the member 30b may be eliminated, as is illustrated, for example, in Fig. 7 of the drawings. In such case, the opening 39 is unnecessary, since no interference with the pin 38 by the base 30 can occur. It will be understood that instead of employing the arrangement illustrated where the angle irons 37 and the arms 35 are interconnected by the pins 29 and 38, an arrangement may be provided whereby these two are welded together or otherwise integrally related. However, by employing the pivot pin 38, it is possible to remove this pin and permit the arms 35 to pivot about pin 39 for ready removal of the brakedrum 20 from between the brake shoes 22 and 23, which will become more apparent as the following description proceeds.

In accordance with the present invention, the supporting arms 37 extend from the pivot pin 29 beyond the brake shoe supporting arms 25 for supporting thereon an electromagnet generally designated at 40. This electromagnet includes a suitable frame 41 which may be bolted as indicated at 42 or otherwise secured to the arms 37 as clearly indicated in Fig. 1 of the drawings. The electromagnet 40 includes a suitable winding 43 and a plunger type armature 44 associated therewith in the conventional manner.

For the purpose of balancing the moment about pin 29 caused by the weight of the electromagnet 40 disposed on arms 37 pivoted on pivot pin 29, there is provided a suitable spring 46 which is illustrated as a coiled compression spring having one end thereof set in a recess 47 defined in the base 30, while the other end extends between the two supporting arms 37 into engagement with the frame 41 of the electromagnet 40 to which it may be welded or otherwise secured, if desired. This spring has such strength and spring characteristic and is so located relative to the lever arm provided by the supporting arms 37 as to substantially balance any unbalanced moment about the pivot pin 29 caused by the weight of the electromagnet 40. As will become apparent as the following description proceeds spring 46 may take various forms and may be replaced by suitable alternatives.

In order to transmit the force applied to armature 44 upon energization of the electromagnet 40 to the brake shoes 22 and 23 there is provided a main operating lever 49 having one end pivotally supported on a pin 50 extending through the auxiliary arms 35, but not through the brake shoe arms 26. So that this may be the case, the upper ends of arms 26 have a considerably reduced cross section, as clearly indicated at 26a in Figs. 2 and 3 of the drawings whereby the pivot pin 50 for the main operating lever 49 does not interfere with the brake shoe arms 26. The lever 49 is indicated as a channel-shaped member having an opening 53 at its end remote from pivot pin 50 to receive the end of a link or clevis 54 connected to the armature 44 of the electromagnet 40. The link 54 is preferably connected to armature 44 and main operating lever 49 by pins 55 and 56 respectively as is clearly evident from the drawings. Preferably, the connection of the main operating lever 49 with the solenoid armature 44 is one permitting considerable freedom of movement in various directions so that the device may readily adjust itself following operation in either direction of the electromagnet 40. To accomplish this, the opening 53 is sufficiently large freely to accommodate the end of the link 54 which may have a suitable shoulder 54a. The pin 56 and the shoulder 54a limit the vertical movement of the lever 49 relative to the link 54.

Figure 3:
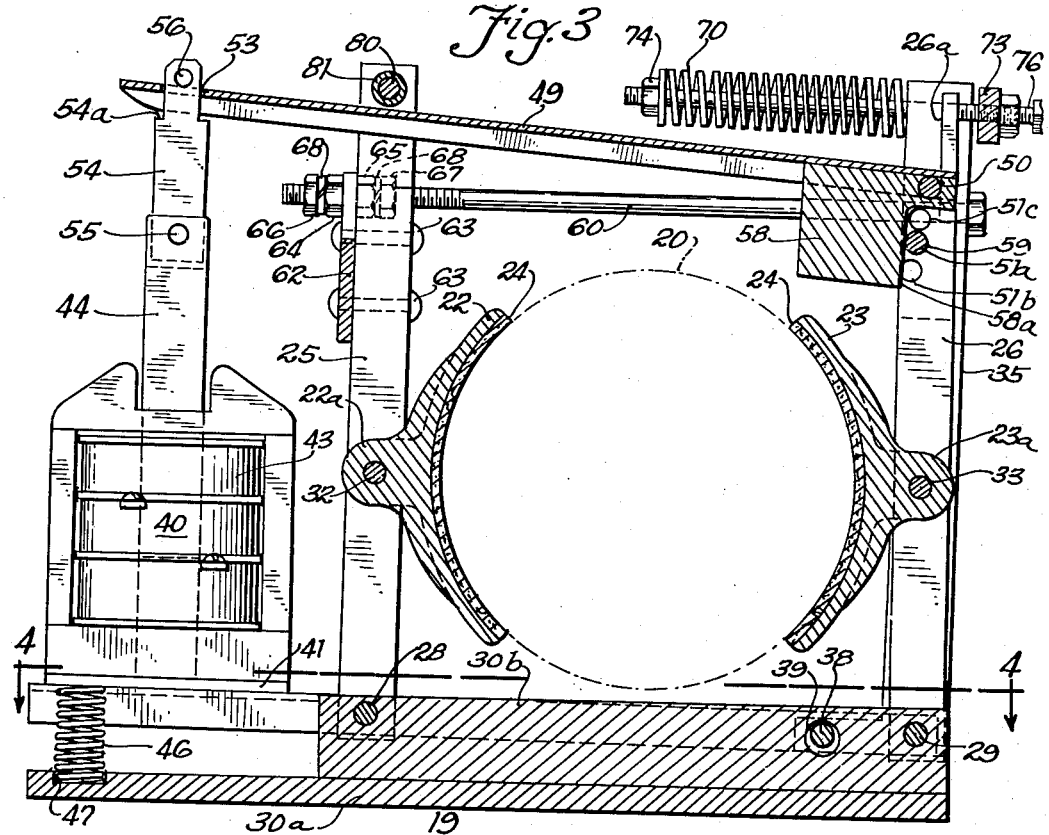
Fig. 3 is a sectional view taken on line 3—3 of Fig. 2 but showing the opposite condition of the brake from that shown in Fig. 1, namely, the spring set condition thereof.
Figure 4:
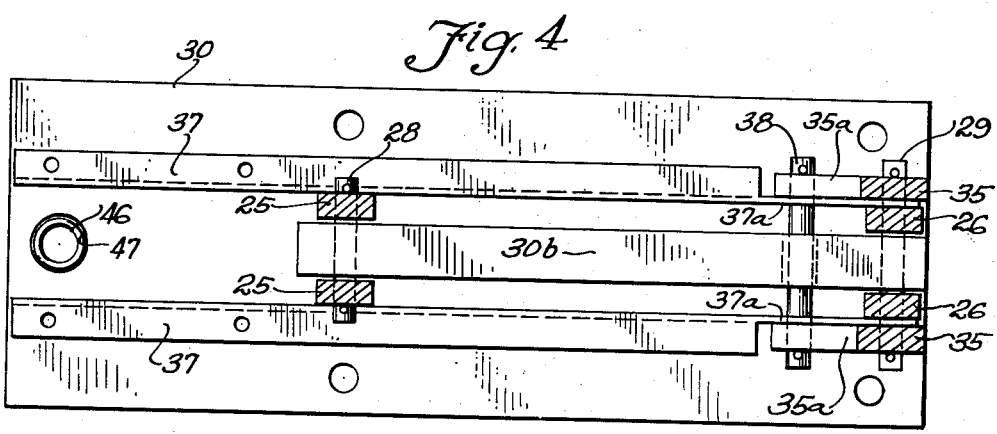
Fig. 4 is a sectional view taken on line 4—4 of Fig. 3 assuming that Fig. 3 shows the complete structure.

Energization of electromagnet 40 will cause the armature 44 to move from the position shown in Fig. 3 to the position shown in Fig. 1 with the resultant pivotal movement of lever 49 about pivot pin 50. In order to transmit this pivotal movement to the brake shoe supporting arms 26, the main operating lever 49 is provided adjacent its pivoted end with an extension 58 providing in effect a cam surface 58a for engagement with a pin 59 extending only between the two brake shoe supporting arms 26 and disposed within openings 51a defined therein thereby in effect uniting these two arms in the same manner as the pin 33 pivotally supporting the brake shoe 23. Downward movement of the main operating lever 49 as viewed in Fig. 3 of the drawings, for example, with a resultant counterclockwise rotation about pivot pin 50 causes the cam surface 58a to engage the pin 59 and furthermore causes limited clockwise rotation of the arms 26 about pivot pin 29. Preferably, brake shoe supporting arms 26 are provided with a plurality of additional openings such as 51b and 51c in addition to the opening 51a in which pin 59 is inserted for selectively receiving the pin 59 for the purpose of changing the lever ratio between the main operating lever 49 and the brake shoe supporting arms 26. This feature gives the brake 19 a wider range of braking capacities and makes it possible to keep the electromagnet 40 within its optimum load range for a wide range of brake torques which might be involved. Thus, for a small braking capacity, pin 59 might be placed in openings 51b while for larger brake loads, pin 59 might be placed in openings 51c.

From the above description, it will be apparent that energization of electromagnet 40 will cause relative pivotal movement of auxiliary arms 35 and brake shoe supporting arms 26. To also render effective brake shoe supporting arms 25 so that brake shoes 22 and 23 are simultaneously effective, the arms 25 are connected to auxiliary arms 35 through tie or torque bolts 60, a pair of which are disclosed in the drawings. In order to accommodate two tie bolts 60, each of the arms 35 is provided with an enlargement near its upper end which may be an integral enlargement or may comprise a short section welded or otherwise secured thereto. This enlargement is indicated at 35b and is best shown in Fig. 6 of the drawings. For the purpose of attaching tie bolts 60 to the arms 25, there is provided a suitable cross plate 62 of somewhat U-shaped configuration which may be riveted as indicated at 63 to the arms 25. The cut away portion of the plate which gives the plate its U-shaped configuration, provides the necessary space to permit movement of the main operating lever 49. The cross plate 62 is provided with suitable openings to accommodate the tie bolts 60. As illustrated the head ends of the tie bolts 60 engage the arms 35 and extend through suitable openings in the enlarged portions 35b. The other ends of the bolts 60 extend through the cross plate 62 and suitable adjusting nuts 64 and 65, lock nuts 66 and 67 and lock washers 68 are applied thereto for adjusting and maintaining the proper and desired brake shoe clearance. The torque or tie bolts 60 are effectively tension bolts since the arms 25 and 35 cannot move inwardly toward each other because of the interposed brakedrum 20 and brake shoes 22 and 23, but they could move apart if it were not for the interposed tie bolts 60.

In order that the brake shoes 22 and 23 may be biased into braking engagement with the brakedrum 20 when the solenoid or electromagnet 40 is deenergized as shown in Fig. 3 of the drawings, energy storage means are provided designated as compression springs 70, each supported on an associated bolt 71 extending through suitable openings provided in the arms 35 which openings are substantially parallel to the openings accommodating the tie bolts 60. These spring supporting bolts 71 also pass through a force transfer bar 73 extending across the upper ends of the auxiliary arms 35 and hence also across the portions 26a of the brake shoe supporting arms 26. As illustrated, the force transfer bar 73 is mounted on the opposite side of the arms 35 from the springs 70. Suitable nuts 74 applied to the spring supporting bolts 71 control the amount of compression applied to the springs 70 and hence the force transmitted between the force transfer bar 73 and the auxiliary arms 35. The force transfer bar 73 is so called since it transfers the spring force to the arms 26 and this is accomplished by means of a pair of set screws 76 and 77, best shown in Fig. 2 of the drawings, which set screws threadedly engage cross bar 73 and the ends thereof bear against the projections 26a of the brake shoe supporting arms 26. Suitable lock nuts 78 are applied to the set screws 76 and 77 in order that they may remain permanently adjusted.

By tightening the nuts 74 engaging the energy storage means comprising the spring 70, an increased force is set up between the force transfer bar 73 and the arms 35. This force, when the brake 19 is properly adjusted, multiplied by the ratio between the lever arms comprising (1) the distance between pivot pin 29 and the set screws 76 and 77 and (2) the distance between the pivot pins 29 and 33 constitutes the force applied to the brakedrum 20 and this latter force multiplied by the coefficient of friction of the brake linings 24 is the tangential force acting on the brakedrum 20. By adjusting the set screws 76 and 77, it is possible to push the arms 26 and the brake shoe 23 against the brake wheel 20 until the force transfer bar 73 is moved away from the L-shaped auxiliary arms 35 whereby the total pressure of the energy storage means comprising the springs 70 is applied entirely to the brake shoe supporting arms 26 and thence through shoes 22 and 23 to the brakedrum 20. As the brake linings 24 wear, the space between the cross bar 73 and the auxiliary arms 35 decreases in proportion to the wear of the linings, but this space can be reestablished by readjustment of the set screws 76 and 77. The wear of the linings 24 can also be taken care of by adjustment of the nuts 64 and 65 associated with the tension or torque bolts 60. It will be understood that by virtue of the tension bolts 60 interrelating the supporting arms 25 and the auxiliary arms 35 that the supporting arms 25 are moved relative to the brake drum 20 in the same manner as the arms 26.

From the above description, it will be apparent that the torque controlling system of the present invention comprises a closed action-reaction mechanical circuit comprising the auxiliary arms 35 pivoted to the base at pin 29, main operating lever 49 pivoted thereto on pivot pin 50, pin 56, clevis or link 54, pin 55, armature or plunger 44, electromagnet frame 41, and solenoid supporting arms 37 also pivoted at pin 29. Pin 29 is fixed and may be referred to as the "nodal axis." By properly setting up the cam surface 58a and the position of pin 59 as well as the direction of operation of the electromagnet 40, it is possible to completely or partially release the brake 19 or to completely or partially set the brake 19.

The torque absorbing system also comprises a closed action-reaction mechanical circuit comprising the brake shoe supporting arms 25 and 26, the associated brake shoes 22 and 23 with the interposed brakedrum 20, and the portion of the base 30 which holds the supporting arms together.

The pivot point or "nodal axis" 29 for each of the two systems is illustrated as being at least substantially coaxial for the two closed action-reaction circuits referred to above. The torque adjusting system comprises the energy storage means including the springs 70, the spring supporting rods 71, the force transfer bar 73, the adjusting set screws 76 and 77 and the tie rods 60. By changing the position of the set screws 76 and 77, the pressure upon the brake shoes 22 and 23 may be adjusted to any desired value within the limitations of the energy storage means and once adjusted, the torque controlling system will control the torque applied within the limitations of its adjustment. The overall lever ratio of the brake 19 is the ratio of (1) the distance between the center line of the armature of the electromagnet 44 and the center line of the pivot pin 50 of the main operating lever 49 and (2) the distance between the pivot pin 50 and the pin 59; multiplied by the ratio of (1) the distance between pivot pins 59 and 29 and (2) the distance between pivot pins 29 and 33.

For the purpose of limiting and cushioning the upward movement of the main operating lever 49 upon deenergization of the electromagnet 40, there is provided a stop comprising a pin 80 extending between the brake shoe supporting arms 25 near the upper end thereof. Suitable cushioning means in the form of a sleeve 81 may be associated with the stop 80. When the solenoid or electromagnet 40 is deenergized, the main operating lever 49 moves upwardly and is prevented from moving too far in an upward direction by the pin 80 and associated cushioning or shock absorbing means 81.

Although the brake shoe supporting arms 26 are shown as pivoted on the pivot pin 29, which simultaneously supports the L-shaped auxiliary arms 35, this is not essential since these arms need not be coaxially mounted. By mounting the arms 26 and 35 on separate pivot points, it is possible to obtain still different overall operating ratios and different operating characteristics than can be obtained by the arrangement employing the common pivot pin 29.

Should it become necessary to remove the brakedrum 20, this can readily be accomplished by removing the pin 38 whereby arms 26 and 35 and the brake shoe 23 are free to rotate about pivot pin 29. By further removing the stop pin 80, the main operation lever 49 can be swung upward to a sufficient extent so that the plunger 44 can move out of the electromagnet 40 whereby the arm 49 will be free to swing around pivot pin 50 to a wide open position. By further removing the nuts 64 and 66 from the tie bolts 60, these bolts can be removed from the cross plate 62 by pushing them to the right as viewed in Figs. 1 and 3 of the drawings whereby both the brake shoes 22 and 23 may be moved away from the brakedrum 20 until the arms 26 and 35 lie horizontally, with the compression springs 70 and the tie bolts 60 extending in a generally vertical direction. It will be noted that as soon as the nuts 64 and 66 are removed from the tie bolts 60, the spring pressure causes the cross bar 73 to move against the L-shaped auxiliary arms 35. However, the springs remain set in the desired position and the brake is open for the removal of the brakedrum 20, without in any way disturbing the spring setting and hence the torque setting of the brake 19. Also, since it is unnecessary to remove the nuts 65 and 67, the brake setting further remains undisturbed since when the brake wheel is replaced, the tie bolts 60 can be reinserted in the cross plate 62 and the nuts 64 and 66 replaced exactly as they were before the brakedrum 20 was removed.

In view of the detailed description included above, the operation of the brake 19 will readily be understood by those skilled in the art. Briefly, when main operating arm 49 is in its upper position as shown in solid lines in Fig. 3 and dotted lines in Fig. 1, the brake 19 is set with a braking force dependent upon the energy stored in the springs 70 and the particular relationship of the lever arms discused above. Upon energization of the electromagnet 40, the plunger 44 moves downwardly pulling the main operating lever 49 to the solid line position shown in Fig. 1 of the drawings. This causes, through the action of cam surface 58a and pin 59, the brake shoe supporting arms 26 to pivot in a clockwise direction as viewed in Fig. 3 of the drawings about pivot pin 29 thereby producing a space between the brake lining 24 of brake shoe 23 and the brakedrum 20. Thereafter, the weight of the electromagnet 40 and the movement of the brakedrum 20 causes the electromagnet 40 to move downwardly pivoting the solenoid supporting arms 37 about the pin 29 to a sufficient extent to relieve the pressure on the brake shoe 22 whereby the brakedrum 20 can move freely between the brake shoes 22 and 23.

Should the solenoid be deenergized, the reverse process occurs. When the brake linings 24 are new, the solenoid plunger 44 and the main operating lever 49 do not move fully against the stop 81 when the brake 19 is in the set position. As the linings 24 wear, however, the main operating arm 49 and the plunger 44 will assume correspondingly higher positions upon setting of the brake in proportion to the wear of the linings until finally the main operating lever 49 strikes the stop 81. Thereafter any further wear will cause the brake linings 24 to begin to slip and adjustment must be made either by the set screws 76 and 77 or the nuts 64 and 65 on the tie bolts 60 or by adjustment of both of the above to take up the wear on the brake linings 24.

Since one of the nodal axes of the two closed action-reaction oscillating systems of the present invention has been indicated as the pivot point 29, considerably to one side of the electromagnet 40, it is necessary to employ a substantial spring force in the spring 46 in order to balance the force due to the weight of the solenoid. It will be understood, however, that this pivot point may be changed relatively to the solenoid supporting means so that a weaker spring or no spring may be employed. In Fig. 7 of the drawings, there is illustrated a modification of the present invention illustrating how the spring 46 may be completely replaced, partially replaced, or replaced with several different mechanisms. Referring now to Fig. 7 where the brake generally designated at 90 is more or less schematically indicated in order to bring out the features of the modification, there is illustrated the brakedrum 20 mounted on a suitable shaft 21. Also, associated with the brakedrum 20 are the brake shoes 91 and 92 pivotally supported as indicated at 93 and 94, respectively, to brake shoe supporting arms 95 and 96. The brake shoes 91 and 92 are illustrated as being provided with suitable brake linings 97. The brake shoe supporting arms 95 and 96 are pivoted as indicated at 98 and 99, respectively, to a suitable base 100. The base 100 is provided with a pair of upwardly directed projections 101 and 102 at spaced points therealong to support the pivot pins 98 and 99. As in the preceding embodiment, the brake 90 also includes auxiliary arms 103 pivotally mounted to the same pivot pin 98 to which the brake shoe supporting arms 95 are pivoted, which corresponds to the pivot pin 29 in the preceding embodiment. Auxiliary arms 103 are disposed on the outside of the brake shoe supporting arms 95. Unlike the arrangement shown in Figs. 1 to 6 of the drawings, the auxiliary arms 103 are off-set relative to the brake shoe supporting arms 95 and the pivot pin 98 is furthermore not at one end of the base as was the case in the first-described embodiment, but in fact, is closely adjacent to the electromagnet 40, which electromagnet may be identical in every respect with that of the preceding embodiment and hence it, together with the associated parts thereof, is designated by the same reference numerals as in the first described embodiment including the armature 44 and the link or clevis 54. Also, as in the preceding embodiment, there are provided electromagnet supporting arms 106 which extend in a generally horizontal direction and are illustrated as comprising an integral extension of the auxiliary arms 103. The base 100 is provided with an extension 100a for accommodating the compression spring 107, substantially like the compression spring 46 described above. However, since the lever arm comprising the supporting arms 106 is much shorter with reference to the pivot pin 98 than in the preceding embodiment, if spring 107 is alone employed to take care of any unbalanced forces due to the weight of the electromagnet or solenoid 40, it will have a considerably different force constant and spring characteristic than in the case of the preceding embodiment. Instead of or in addition to the spring 107, there may be provided a tension spring 108 connected to a lever arm 109 indicated as being integral with the solenoid supporting arms 106 and the auxiliary arms 103. As illustrated, the tension spring is connected to the base 100 which may be provided with a suitable fastening means 100b. Similarly the lever arm 109 may be provided with a suitable fastening means 109a. The tension spring 108 is illustrated as interconnecting these fastening means 100b and 109a. It will be apparent that the tension spring 108 functions in exactly the same manner as the compression spring 107 and either spring 107 or 108 appropriately designed or both springs 107 and 108 may be employed, the only criterion being that one or both of these springs, depending upon which are employed, have the necessary overall characteristics to balance the force due to the weight of the solenoid or electromagnet 40. In addition to the springs 107 and 108 or in lieu thereof or in combination with one or both thereof, the unbalanced forces due to the weight of the electromagnet 40 may be balanced by a suitable weight 111 acting through a lever arm such, for example, as 109.

In order to relate the brake shoe supporting arms 96 and the auxiliary arms 103 as in the preceding embodiment, there are provided suitable tie bolts 113 interconnecting the upper ends of these sets of arms. Also, for the purpose of applying a spring pressure to cause the brake shoes 91 and 92 to frictionally engage the brakedrum 20, there are provided the spring supporting bolts 115 and the associated energy storage means in the form of compression springs 116 corresponding to these elements in the preceding embodiment. The spring supporting bolts 115 are provided with adjusting nuts 117. A pair of cross bars or force transfer bars 118 and 119 transfer the spring force to the brake shoe supporting arms 95 and the auxiliary arms 103, respectively, in a manner to tend to pivot the brake shoe supporting arms 95 in a clockwise direction and the auxiliary arms 103 in a counterclockwise direction as viewed in Fig. 7 of the drawings, thus applying the brake to the brakedrum 20. The nuts 117 associated with the spring supporting bolts 115 control the magnitude of the braking force applied to the brake shoe supporting arms 95. In order to release the brake in response to energization of the electromagnet 40, there is provided the main operating lever 121, illustrated as a T-shaped lever, pivotally mounted to the auxiliary arms 103 by means of pivot pin 122 extending through the portion of the T adjacent the junction between the arms thereof. The main operating lever 121 has its free end connected by means of a pivot pin 123 with the link 54 associated with the electromagnet 40. Instead of employing the pin and cam surface arrangement described above, to transmit the brake releasing force from the main operating lever to the brake shoe supporting arms, there is illustrated in Fig. 7 a link arrangement including extensions or arms 121a and 121b of the T-shaped main operating lever 121 and a link 124 interconnecting one of these extensions with one of the brake shoe supporting arms. As illustrated in Fig. 7 of the drawings, the extension 121a is connected by the link 124 with brake shoe supporting arms 95. The link 124 is preferably so connected by pivot pins 125 and 126 extending through the arms 95 and extension 121a respectively.

In order to eliminate any unbalanced moments acting upon the brake shoe supporting arms 96, there is additionally provided a weight 130 acting through a lever arm 131. It will be understood that the weight 130 may be partially or wholly replaced or supplemented by a compression or a tension spring similar to the springs 107 and 108. The moment applied to the brake shoe supporting arms 96 by the weight 130 acting through the lever arm 131 is opposed by the tie bolts 113 which in turn apply a force to the auxiliary arms 103 thereby creating a moment on the auxiliary arms 103 in opposition to the moment produced by the weight of the solenoid or electromagnet 40. Thus, it will be apparent that the weight 130 may be used alternatively instead of the weight 111 or the springs 107 or 108 or any combination with one or more of these elements. In the particular embodiment illustrated in Fig. 7, where the weights 111 and 130 and the springs 107 and 108 are all employed, the design will be such that the combination of all these elements will neutralize the weight of the electromagnet 40 as well as that of any other forces which might cause unbalance. If, for example, the weight 130 is used alone, then it will be understood that static balance of the system as a whole is obtained since it is necessary to convey the force produced by the weight 130 through the system to counterbalance the electromagnet 40. On the other hand, if the weight 111 alone is employed, then a static balance with respect to the nodal axis or pivot point 98 is obtained.

In view of the detailed discussion included above, the operation of the brake 90 shown in Fig. 7 will readily be understood by those skilled in the art. As illustrated, the solenoid 40 is deenergized and the brake is in its applied condition. Upon energization of solenoid 40, the brake will be released. Upon deenergization of the electromagnet 40, the force transfer bar 119 may move away from the auxiliary arms 103 a short distance comparable with the space provided between the force transfer bar 73 in Fig. 1 of the drawings and the auxiliary arms 35.

Although in the arrangements disclosed thus far, spring-set, electromagnetically-released brakes have been illustrated, the arrangement disclosed in Fig. 7 can readily be converted to a spring-released electromagnetically-set brake as indicated in Fig. 8 of the drawings where the corresponding parts are designated by the same reference numerals. Essentially, the only difference between Figs. 7 and 8 is that the brakedrum 20 is to the left of the brake shoe supporting arms 95 and consequently the right hand brake shoe 92 is supported from the pivot pin 93 attached to the brake shoe supporting arms 95 while the brake shoe supporting arms 96 are pivoted to the base 100 to the left of the brake shoe supporting arms 95 and pivotally support lefthand brake shoe 91. The tie rods 113 interconnect the same arms 96 and 103 as in Fig. 7. The arm 121a of the main operating lever is connected by means of a link 132 and pivot pins 133 and 134 with the brake shoe supporting arms 95 as in Fig. 7. The electromagnet 40 is again shown in the deenergized condition, in which case the brake shoes do not frictionally engage the drum 20 in braking action. When the electromagnet 40 is energized, the force transfer bar 119 is spaced from the auxiliary arms 103, a distance which indicates that a substantial wear of the brake linings 97 may occur before adjustment of the brake is required. The brake in Fig. 8 is designated as 90' to distinguish it from the brake 90 shown in Fig. 7 of the drawings.

In all of the arrangements described thus far, the electromagnetically controlled brake has comprised in addition to at least one pair of brake shoe supporting arms, auxiliary arms tied in with tie bolts or the like with the rest of the system. In Fig. 9 of the drawings there is illustrated a brake 150 in which the auxiliary arms have been completely eliminated. The corresponding parts of Fig. 9 are designated by the same reference numerals as in Fig. 7 of the drawings. In this arrangement, instead of the tie bolts 113, there are provided combined spring support and tie rods 151 which interconnect the upper ends of the brake shoe supporting arms 95 and 96, and as their name implies, additionally support the compression springs 116 at the ends of the tie rods 151 projecting beyond the brake shoe supporting arms 95. The threaded ends of the tie rods are provided with brake force adjusting nuts 117 and brake wear adjusting nuts 152 respectively. The same force transfer bars 118 and 119 are employed, one disposed on one side of the brake shoe supporting arms 95 and the other disposed on the opposite side of brake shoe supporting arms 96, whereby the energy stored in the compression springs 116 tends to pull the upper ends of the brake shoe supporting arms 95 and 96 towards each other and hence tries to force the brake shoes 91 and 92 into braking engagement with the brake drum 20. The main operating lever 121 is indicated as substantially identical with the main operating lever 121 of Fig. 7 of the drawings, but in this case is pivoted as indicated at 153 to the brake shoe supporting arms 95. In addition, a link 154 connects the downward extension 121b of the main operating lever 121 to the brake shoe supporting arms 96, the link 154 including pivot pins 155 and 156, respectively, connecting the link with the extension 121b and the brake shoe supporting arms 96, respectively. The springs 107 and 108 of Fig. 7 have been omitted, although it should be understood that they might equally well be used, if desired, in place of or in addition to the weights 111 or 130. In Fig. 9, the brake shoe supporting arms 95 are illustrated as being provided with integral extensions 157a and 157b for supporting electromagnet 40 and weight 111, respectively. In the preceding embodiment, these elements were supported from the auxiliary arms. By adjusting the nuts 117 associated with the spring end of the combined tension or tie and spring supporting rods 151, the pressure exerted by the brake shoes 91 and 92 can be adjusted. Furthermore, by adjusting the nuts 152 at the other end of the combined spring supporting and tie rods 151, adjustment for wear on the brake shoes can be made. Suitably attached to the rods 151 as by pin 158, is a stop or limit member 159. This stop when engaged with one side of the arms 95 determines the amount of brake lining wear permissible without further adjustment of nuts 152. The permissible wear for the adjustment shown is determined by the space between stop 159 and brake shoe supporting arms 95 when the brakes are set.

Figure 10:
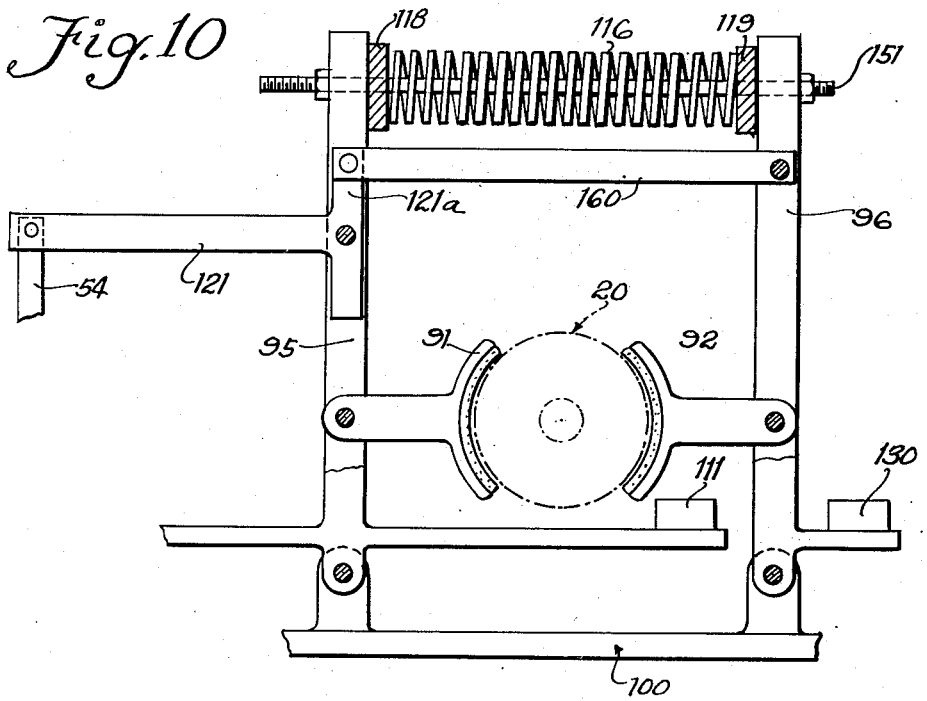
Fig. 10 is a fragmentary view similar to Fig. 9 illustrating a spring-released electromagnetically-set brake.

The arrangement disclosed in Fig. 9 of the drawings may readily be converted to a spring-released electromagnetically-set type of brake as is best shown in Fig. 10 of the drawings, where the corresponding parts are designated by the same reference numerals. In this case, a link 160 interconnects the upwardly directed arm 121a of the main operating lever 121 with the brake shoe supporting arms 96, and the compression springs 116 are disposed on the combined tie and spring supporting rods 151 between the brake shoe supporting arms 95 and 96 so as to bias the arms apart. Otherwise the elements shown in Fig. 10 are identical with those shown in Fig. 9.

Figure 11:
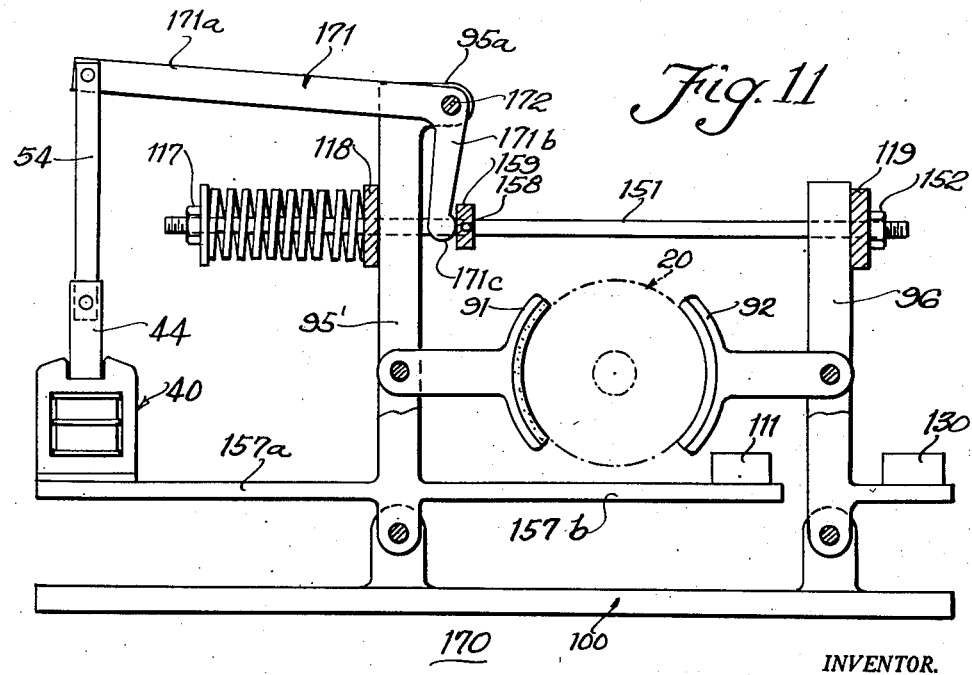
Fig. 11 illustrates still another modification of the brake shown in Fig. 9 providing simple means for removing the brakedrum from between the brake shoes.

In Fig. 11 of the drawings, there is illustrated a modification of a brake generally designated as 170, in which it is possible to eliminate the links 154 of Fig. 9 extending between the two sets of brake shoe supporting arms 95 and 96. This is a very important advantage in the event of brakes of unusually large size, since the links 154 of Fig. 9 are compression members and to be able to transmit large forces, it means that the links 154 must be of unusually large size so as not to buckle under these high compressive forces transmitted thereover. Hence, if the brake 150 of Fig. 9 of the drawings is to be used for heavy braking applications, the arrangement disclosed in Fig. 11 is preferable, since it eliminates the requirement of the compression links 154. The corresponding parts of Fig. 11 are designated by the same reference numerals as in Fig. 9 of the drawings. The brake shoe supporting arms designated as 95' are substantially identical to the arms 95 of Fig. 9, but are provided at their upper ends with a lateral extension 95a for pivotally supporting a bell crank 171 on pivot pin 172. The crank 171 includes the main arm portion 171a which acts as the main operating lever and is connected by the link 54 to the armature 44 of the electromagnet 40. The other arm 171b of the bell crank is provided with a spherical bearing portion 171c which engages with the stop member or cross bar 159 pinned to the combined tie rods and spring supports 151. Upon energization of the electromagnet 40, the bell crank 171 pivots in a counterclockwise direction as viewed in Fig. 11 of the drawings and moves the cross bar 159 to the right so as to effectively separate the brake shoe supporting arms 95' and 96 and hence to release the brake. Upon deenergization of the electromagnet 40, the spring force will tend to push the brake shoe supporting arms 96 and 95' toward each other to apply the brake shoes 91 and 92 into frictional engagement with the brakedrum 20. It will be apparent that the arrangement of Fig. 11 is unusually desirable from the standpoint of permitting easy removal of the brakedrum 20 since all that is necessary is to remove the nuts 152 from the righthand end of the combined spring support and tie rods 151, whereupon the brake shoe supporting arms 95' and 96 may be moved apart about their respective pivot pins without affecting the spring adjustment. However, the adjustment for wear controlled by the nuts 152 will have to be readjusted upon replacing the brakedrum 20.

Instead of employing weights such as 111 and 130 or springs 107 and 108 to counteract the unbalanced weight of the electromagnet, this unbalance may be counteracted by a similar or identical electromagnet which may function to aid the first electromagnet in applying or releasing the brake or in which either electromagnet separately can apply or release the brake. Such an arrangement is especially desirable where it is essential for the apparatus with which the brake is associated to remain operative at all times. With such a double solenoid arrangement, if the winding of one solenoid, for example, should burn out, then the other solenoid or electromagnet could be used to actuate the brake and the defective solenoid winding could be repaired without delay or shut-down. Such an arrangement is disclosed in Figs. 12, 13 and 14 of the drawings, and is generally designated by the reference numeral 180. As illustrated, the brake 180 comprises a base 181 comprising a main base portion 181a and an upwardly extending rib 181b corresponding closely to that arrangement shown in Fig. 1 of the drawings. The main base portion 181a extends beyond the portion 181b at both ends, as contrasted with Fig. 1 where it extends beyond at only one end. Pivotally mounted to the portion 181b of the base 180 are a pair of lefthand brake shoe supporting arms 182 and a pair of righthand brake shoe supporting arms 183 each quite similar to the brake shoe supporting arms 26 of Fig. 1 of the drawings. These arms are pivoted to the pivot pins 184 and 185, respectively, which as in Fig. 1 comprise the nodal axis of the brake system depending upon which solenoid of the double solenoid arrangement is under consideration. Also, pivoted to the pivot pins 184 and 185 are two sets of auxiliary arms 187 and 188 each very similar to the auxiliary arms 35 of Fig. 1. These auxiliary arms are furthermore of L-configuration just as the auxiliary arms 35, so as additionally to accommodate the pins 189, and 190, respectively. The auxiliary arms 187 and 188 are interconnected by tie bolts 191. Also, as is indicated in Fig. 1, the auxiliary arms 187 have associated therewith solenoid supporting arms 192 which are pivoted to the pivot pin 184 and are effectively made an integral part of the arms 187 by the pin 189 corresponding with the pin 38 of Fig. 1. Similarly, the auxiliary arms 188 have associated therewith a pair of solenoid supporting arms 193 pivoted about the pivot pin 185 and effectively made integral with the auxiliary arms 188 by the pin 190. An electromagnet 194 is supported on the solenoid supporting arms 192 and an identical electromagnet 195 is supported on the supporting arms 193. These electromagnets may be identical in every respect with the electromagnet 40 of Fig. 1 of the drawings.

The lefthand brake shoe supporting arms 182 are illustrated as supporting the brake shoe 198, while the righthand brake shoe supporting arms 183 are illustrated as supporting the brake shoe 199, these brake shoes being pivotally supported on the respective brake shoe supporting arms by pivot pins 200 and 201, respectively. It will be understood that the solenoids 194 and 195 and the lever arms through which they act can be so designed as to neutralize any unbalanced forces. If desired, however, suitable springs 202a and 202b similar to the spring 46 of Fig. 1 may be employed.

For the purpose of applying a braking force to the brakedrum 20, energy storage means in the form of springs 203 are supported on suitable spring supporting bolts 204 extending from the upper ends of the auxiliary arms 187. The spring forces are transmitted to the brake shoe supporting arms 182 through a force transfer bar 205 having one side in engagement with the springs 203 and the other side engaging the side of the brake shoe supporting arms 182 opposite the side upon which the brake shoe 198 is disposed. An identical energy storage means comprising the springs 208, the spring supporting bolts 209 and the force transfer bar 210 is associated with the auxiliary arms 188 and the brake shoe supporting arms 183.

In order to release the brake by removing the spring force applied by the springs 203 and 208, there is provided a main operating lever 210 associated with the electromagnet 194 and a main operating lever 211 associated with the electromagnet 195. The main operating lever 210 is pivotally supported on the auxiliary arms 187 as indicated by the pivot pin 212. The main operating lever 210 is furthermore provided with a lateral projection 210a engageable with a pin 215 interconnecting the auxiliary arms 182, whereby energization of the electromagnet 194 causing downward movement of its armature 194a and the link 216 causes the projection 210a to engage the pin 215 and tend to move brake shoe supporting arms 182 in a counterclockwise direction about pivot pin 184 thereby releasing the brake shoe 198 and by virtue of the tie rods 191 similarly releasing the brake shoe 199. The identical releasing action can be provided through energization of the solenoid 195 since the main operating arm 211 is provided with a projection 211a for engagement with a pin 218 pinned to the brake shoe supoprting arms 183. The main operating lever 211 is furthermore pivoted on a pivot pin 219 supported by the auxiliary arms 188. The solenoid 195 includes the armature 195a and the link 220 connecting the armature with the main operating lever 211. With this arrangement, either solenoid 194 or solenoid 195, when energized, will release the brake by separating the brake shoes 198 and 199 from the brakedrum 20. Furthermore, the solenoids themselves tend to neutralize any unbalanced moments that might be present by virtue of the weights of these solenoids themselves. In the event that one of the solenoid windings should burn out as is sometimes the case, the brake 180 is still completely operative. As is best shown in Fig. 14 of the drawings, it is assumed that the winding of the solenoid 195 has burned out and this solenoid is removed and replaced with a dummy weight 225 to take care of any unbalanced moments. The brake may be operated by the electromagnet 194 just as if both electromagnets were in place and when the electromagnet 194 is repaired, it may be replaced and the dummy weight 225 removed.

If desired, both of the solenoids 194 and 195 may be used to release the brake. In this case, the total releasing movement produced by one solenoid need only be sufficient to release the associated brake shoe. This, of course, makes it possible to use a greater lever ratio on the main operating lever, than if one solenoid were required to release both shoes, since for the same torque capacity, each individual solenoid is only half as powerful as required for single solenoid operation. Preferably, however, in order to take advantage of repair and replacement of one solenoid while the other functions, the lever ratio is proportioned to permit one solenoid alone to release the brake and in such case, selective control means will be provided so that the operator may select at will either solenoid for operating the brake 180.

In view of the detailed description included above, the operation of the arrangement disclosed in Figs. 12, 13 and 14 will readily be understood by those skilled in the art. Each individual solenoid unit comprises a spring-set electromagnetically-released brake system which, depending upon the lever ratios involved, may individually or in connection with the associated solenoid arrangement, release the brake upon energization of the solenoids.

It should be understood that the double solenoid principle of Figs. 12, 13 and 14 is also applicable to the other embodiments disclosed. A very simple arrangement results when applied to Fig. 10, for example. In this case a second lever 121 would be pivoted to arm 96 and the link 160 might then interconnect the two portions 121a of the two levers 121.

In the above described arrangements, the torque absorbing, the torque controlling and the torque adjusting systems will be readily understood and uniform operation will be obtained without the difficulties encountered in prior art arrangements where static forces are not balanced out and the torque controlling system is not set up into a closed action-reaction circuit oscillatably mounted substantially coaxial with a nodal axis of the torque absorbing system.

It should be understood that the present invention is not limited to the specific details of construction and arrangement thereof herein illustrated and that changes and modifications will occur to those skilled in the art without departing from the present invention. It is aimed in the appended claims to cover all such changes and modifications as fall within the true spirit and scope of the present invention.

What is claimed as new and desired to be secured by Letters Patent of the United States is:

1. In a shoe brake the combination with a brakedrum of a pair of opposed brake shoes therefor, a mounting base therefor, a pair of spaced apart brake shoe supporting arms for supporting each of said brake shoes, a pair of auxiliary arms fulcrumed co-operatively with one pair of said brake shoe supporting arms, resilient means mounted upon the free end of said auxiliary arms and in opposed relation to the adjacent pair of brake shoe supporting arms forcing said brake shoe supporting arms toward said brakedrum, tension means connecting the free ends of the auxiliary arms and the free ends of the opposite pair of brake shoe supporting arms thereby restraining the movement of the free ends of the brake shoe supporting arms and causing said brake shoes to engage said brakedrum with a force related to the force of the resilient means, a main lever pivoted upon the free ends of said auxiliary arms and provided with a cam means for transmitting a reduced outward motion to the free ends of the brake shoe supporting arms adjacent said auxiliary arms and against the force of the resilient means when said lever is moved in one direction for relieving the tension existing between the free ends of said auxiliary arms and the free ends of the other brake shoe supporting arms thereby releasing the brake, electromagnetic means having a movable element mounted upon projections of said auxiliary arms, resilient means appropriately mounted under the electromagnetic means to substantially support the weight thereof, means for connecting said movable element to the free end of said main lever for actuating the same, the main lever, the auxiliary arms, the projections on the auxiliary arms, the electromagnetic means and said movable element forming a closed action-reaction torque releasing circuit floating upon said last mentioned resilient means and oscillating about the fulcrum of the auxiliary arms which fulcrum forms a nodal point in the torque absorbing circuit, thereby imparting a minimum of reaction to the other parts of said brake.

2. In a friction brake the combination with a brakedrum of a pair of opposed brake shoes therefor, a mounting base therefor, means pivotally mounted upon said base for supporting each of said brake shoes, auxiliary means fulcrumed upon said base cooperatively with said brake shoe supporting means, tension means adjustably mounted upon and restricting the outward movement of said auxiliary means, spring means mounted upon the free ends of said auxiliary means in opposed relation to the respective shoe supporting means forcing the same to engage the brakedrum, lever means fulcrumed upon the free end of said auxiliary means in force transmitting relation with the free end of the respective shoe supporting means for operating same, actuating means mounted upon projections of said auxiliary means and having a moving element operatively connected to said lever means for actuating the same, and resilient means to substantially support the unbalanced weight of said actuating means.

3. In a brake, the combination of a torque absorbing system comprising a brake shoe and brake shoe supporting arm and a torque releasing system, said torque releasing system comprising a pair of auxiliary arms mounted cooperatively with said absorbing system, pivot means for said auxiliary arms, lever means mounted at the free ends of said auxiliary arms, an electromagnet having a movable element for operating said lever means to release the brake, means operatively connecting said movable element to said lever means, rigid members mounted upon the other ends of said auxiliary arms, means for mounting said electromagnet upon said rigid members, and removable means for securing said rigid members to said auxiliary arms, whereby upon removal of said removable means said auxiliary arms are adapted to swing about the said pivot means independently of said rigid members.

4. The combination with a brake wheel, of a pair of brake shoes therefor, two pairs of spaced apart brake shoe supporting arms, each pair of which supports one of said brake shoes, a base plate provided with appropriate means for pivotally mounting one end of each of said pairs of brake shoe supporting arms, a pair of auxiliary arms pivotally mounted upon said base plate adjacent to and in cooperative relation with one pair of said shoe arms, rigid adjustable means connecting the free ends of said pair of auxiliary arms and the free ends of the other pair of shoe arms, spring means interposed between said auxiliary arms and the pair of shoe arms in cooperative relation therewith urging one pair of said shoe arms with its shoe against said brake wheel and urging said auxiliary arms outwardly away from said wheel, said outward stress being transmitted through said rigid adjustable means to the other pair of shoe arms pulling said shoe arms with its shoe against said brake wheel, a main operating lever fulcrumed at the free ends of said pair of auxiliary arms, an electromagnetic means having a movable element, means connecting one end of said lever to said movable element, coacting means on the other end of said lever and on the free ends of the pair of shoe arms adjacent to said auxiliary arms, whereby a movement of the main lever in one direction will transmit a reduced movement to the free ends of said pair of shoe arms against the force of said spring means, thereby releasing the spring pressure against said brake shoes, a pair of supporting arms rigidly and removably connected to the pivoted ends of said auxiliary arms and extending away therefrom for supporting said electromagnetic means, means for mounting said electromagnetic means near the outer ends of said bars, a spring mounted upon said base plate in supporting relation to said electromagnetic means and having sufficient strength to substantially support the unbalanced weight of said electromagnetic means, the auxiliary arms, the main lever, the movable element of the electromagnetic means, the electromagnetic means and the supporting arms comprising a closed oscillating system and forming a torque releasing system adapted to oscillate about the pivot of said auxiliary arms.

5. In a shoe brake, the combination with a brakedrum, of a pair of opposed brake shoes therefor, a mounting base therefor, a pair of spaced apart brake shoe supporting arms for supporting each of said brake shoes, a pair of auxiliary arms pivoted cooperatively with one pair of said brake shoe supporting arms, resilient means mounted upon the free ends of said auxiliary arms and in opposed relation to the adjacent pair of shoe supporting arms forcing said auxiliary arms outwardly away from said brakedrum, tension means connecting the free ends of the auxiliary arms and the free ends of the opposite pair of brake shoe supporting arms, thereby restraining the movement of the free ends of the brake shoe supporting arms and causing engagement of said brake shoes with said brake drum, a main lever pivoted upon the free ends of said auxiliary arms and provided with means for transmitting a force to the free ends of the brake shoe supporting arms adjacent to the auxiliary arms and against the force of the resilient means for relieving the tension existing between the free ends of the auxiliary arms and the free ends of the other brake shoe supporting arms thereby releasing the brake, electromagnetic means having a movable element mounted upon projections of said auxiliary arms, resilient supporting means for said electromagnetic means to substantially support the weight thereof, and means operatively connecting said movable element to the free end of said main lever for the purpose of actuating the same, said main lever, said auxiliary arms, said projections on the auxiliary arms, said electromagnet and said movable element forming a torque releasing system capable of oscillating about and having a nodal point at the fulcrum of said auxiliary arms.

6. In a brake the combination of a brakedrum, a pair of brake shoes disposed on opposite sides thereof, a pair of spaced apart arms fulcrumed upon a base to support each of said brake shoes, an auxiliary pair of arms pivotally mounted adjacent one of said pair of shoe supporting arms, resilient means mounted upon the free ends of said pair of auxiliary arms in reactive relation to the free ends of said one pair of shoe supporting arms for the purpose of setting the brake, means for rigidly and adjustably connecting the free ends of said auxiliary pair of arms and the free ends of the other pair of shoe supporting arms, means for mounting said rigid and adjustable connecting means upon said auxiliary arms and said shoe supporting arms independently of the mounting of the resilient brake setting means, a main lever fulcrumed upon the free ends of said auxiliary pair of arms, coacting means on said lever and said one pair of shoe supporting arms, electromagnetic means having a movable element, means operatively connecting said lever to said movable element, whereby upon operation of said electromagnetic means a reduced movement is imparted to said adjacent pair of shoe supporting arms to release said brake, projections on the auxiliary arms, means for supporting said electromagnetic means on said projections, and resilient means mounted upon the base of said brake for substantially supporting the unbalanced weight of said electromagnetic means and said projections.

7. In a solenoid shoe brake, a torque applying system comprising a brakedrum, a pair of opposed brake shoes oscillating upon appropriate shoe supporting arms pivoted to a base, a brake releasing system comprising a pair of auxiliary arms pivoted upon said base in cooperative relation with one pair of said shoe supporting arms, a main lever pivoted upon the free ends of said auxiliary arms, cam means upon said main lever to operate said shoe supporting arms, a solenoid mounted upon projections of said auxiliary arms and having its moving element connected to the free end of said main lever; spring means at least partially supporting said solenoid, to neutralize the unbalanced moment produced by the weight of said solenoid; one crossbar slidably mounted upon each side of the free ends of said auxiliary arms and straddling the free ends of the two cooperating shoe arms, a spring bolt going through both of said crossbars and a spring adjustably mounted thereon in opposed relation to said shoe supporting arms for setting the brake.

8. In a solenoid shoe brake, a torque applying system comprising a brake wheel, a pair of opposed brake shoes oscillating upon appropriate shoe supporting arms fulcrumed upon a base, a brake releasing system comprising a pair of auxiliary arms fulcrumed upon the base in cooperative relation with one pair of shoe supporting arms, a main lever fulcrumed upon the free ends of said auxiliary arms, coacting means on said lever and said one pair of shoe supporting arms for releasing the brake when said lever is moved in one direction, a solenoid having a movable element, means operatively connecting said movable element to the free end of said lever, projections on said auxiliary arms, means for mounting said solenoid on said projections, spring means interposed between said auxiliary arms and said one pair of shoe arms for applying the brake, connecting means joining the free ends of the auxiliary arms with the free ends of the other pair of shoe supporting arms, and spring means for neutralizing the unbalanced moment caused by the weight of the solenoid, said brake releasing system being capable of oscillating about the fulcrum of said auxiliary arms.

9. The combination with a brakedrum and opposed brake shoes therefor, a mounting base, a pair of spaced apart shoe arms for supporting each of said brake shoes, a pair of auxiliary arms mounted adjacent to and cooperatively with one pair of spaced apart shoe supporting arms, a crossbar straddling the ends of the pair of auxiliary arms and located outwardly from the brakedrum, a bolt mounted in the free end of each auxiliary arm and slidably supporting said crossbar, means on one end of said bolts for limiting the movement of said crossbar in one direction, a spring mounted on each bolt and engaging the inner side of the associated auxiliary arm, nuts on said bolts for adjusting the pressure of said springs, a set screw mounted on said cross bar opposite the free end of each of said one pair of shoe supporting arms for adjusting the distance between said crossbar and the free end of said one pair of shoe supporting arms and for taking up the wear of the brake shoes, a main level fulcrumed upon the free ends of said auxiliary arms, coacting means on said lever and one pair of shoe supporting arms for releasing the brake when said lever is moved in one direction, a solenoid having a movable element, means connecting the free end of said lever to said movable element for releasing the brake, projections on said auxiliary arms, means for mounting said solenoid on said projections, and spring means for supporting the unbalanced weight of said solenoid.

10. The combination with a brakedrum and opposed brake shoes therefor, of a mounting base, a pair of spaced apart brake shoe supporting arms for each of said brake shoes, a pair of auxiliary arms mounted adjacent to and cooperatively with one pair of said brake shoe supporting arms, a crossbar straddling the two free ends of said brake shoe supporting arms and rigidly mounted on the drum side of the two free ends of the auxiliary arms, another crossbar of similar construction similarly located on the opposite side and slidably mounted thereon, a spring bolt mounted through colinear holes on said two crossbars, spring means adjustably mounted upon said spring bolt to apply pressure to the free ends of said brake shoe supporting arms, through the slidably mounted crossbar, for setting the brake, adjustable tension means connecting the free ends of the auxiliary arms with the free ends of the other pair of brake shoe supporting arms for restraining the outer movement thereof, a solenoid mounted upon projections of said auxiliary arms operatively connected to a main lever pivoted upon said auxiliary arms, said main lever having means for operating said brake shoe supporting arms for releasing the brake when moving in one direction, spring means for substantially neutralizing the unbalanced moment caused by the weight of said solenoid.

11. In a shoe brake, the combination with a brakedrum of a pair of opposed brake shoes therefor, a mounting base therefor, means pivotally mounted upon said base for supporting each of said brake shoes, auxiliary arms pivotally mounted in cooperative relation with said shoe supporting means, removable adjustable tension means for restricting the outward movement of said shoe supporting means, resilient means mounted upon the free ends of said auxiliary arms in opposed relation to the cooperating shoe supporting means, forcing the same toward the brakedrum, lever means pivotally mounted upon the free ends of said auxiliary arms and having cam means for transmitting a reduced outward motion to the cooperating shoe supporting means, thereby releasing the brake when said lever means moves in one direction, actuating means mounted upon said auxiliary arms, means for operatively connecting said actuating means to the free end of said lever means for actuating the same, adjustable set screws interposed between said resilient means and said shoe supporting means for adjusting the position of said lever means with respect to said actuating means when mounting the brake, and resilient means suitably mounted under said actuating means for supporting the unbalanced weight thereof.

12. In a shoe brake the combination with a brakedrum of a brake shoe therefor, a mounting base therefor, means pivotally mounted upon said base for supporting said brake shoe, auxiliary arms pivotally mounted in cooperative relation with said shoe supporting means, removable adjustable tension means for restricting the outward movement of said shoe supporting means, resilient means mounted upon the free ends of said auxiliary arms in opposed relation to the cooperating shoe supporting means forcing the same inwardly toward the brakedrum, lever means pivotally mounted upon the free ends of said auxiliary arms and having cam means for transmitting a reduced outward motion to the cooperating shoe supporting means, thereby releasing the brake when moving in one direction, actuating means mounted upon projections of said auxiliary arms, means for operatively connecting said actuating means to the free end of said lever means for actuating same, and resilient means suitably mounted under said actuating means for supporting the unbalanced weight thereof.

13. In a friction brake for controlling the rotation of a brakedrum, a torque absorbing system comprising a frame and a pair of brake shoes capable of being held in braking relationship with said brakedrum by shoe supporting means pivotally mounted upon the frame, and at least one torque controlling system including lever means and an electromagnet interassociated with said torque absorbing system in operative relation therewith, said electromagnet being supported on a portion of said torque absorbing system movable relative to said brake drum so as to be free from external reactions and means for statically balancing said torque controlling system whereby there can occur only equalized operation of said two brake shoes.

14. In a friction brake for controlling the rotation of a shaft, a brakedrum mounted on said shaft, a torque absorbing system comprising two brake shoes mounted upon shoe supporting arms pivotally supported upon a base and capable of moving toward said brakedrum for frictionally engaging said brakedrum or away from said brakedrum, spring means for supplying an adjustable force acting on said brake shoes and urging them to move in one direction relative to said brakedrum, and at least one torque controlling system comprising a closed action-reaction mechanical circuit including an electromagnet pivotally mounted at a nodal point of said torque absorbing system in torque transmitting relationship with said spring means and said shoe supporting arms for controlling the force transmitted to said brake shoes, and static balancing means for said torque controlling system to prevent unbalanced moments from affecting the equilibrium of said brake.

15. In a friction brake for controlling the rotation of a shaft having a brakedrum associated therewith, a torque absorbing system comprising a frame and a brake shoe capable of being held in frictional engagement with said brakedrum by shoe supporting means pivotally mounted upon the frame, and at least one torque controlling system including an electromagnet and lever mechanism oscillatably mounted upon a nodal axis of said torque absorbing system in operative relation therewith, said electromagnet being supported on a portion of said torque absorbing system movable relative to said brakedrum so as to be free from external reactions and static balancing means for statically balancing said torque controlling system about said nodal axis to eliminate the effects of unbalanced moments upon the operation of said brake.

16. In a friction brake, a pair of brake shoes arranged to engage a brakedrum at opposite sides thereof, a frame, oscillating means supported by said frame for supporting said brake shoes, said frame, brake shoes and oscillating means constituting a torque absorbing system; at least one operating system including a lever mechanism and an electromagnet for operating said torque absorbing system and arranged in a closed mechanical linkage, means for pivotally mounting said electromagnet at substantially a nodal axis of said torque absorbing system and means for statically balancing said operating system to eliminate unbalanced moments and thereby their effects upon the equilibrium of the torque absorbing system under all conditions of operation.

17. An operating unit to operate the brake shoes of a friction brake, comprising a shoe arm and an auxiliary arm, means for pivotally supporting said shoe arm and auxiliary arm at one end in substantially coaxial relationship, a brake shoe supported on said shoe arm, actuating means having relatively movable elements mounted on said auxiliary arm, spring means clamping the free ends of said arms together, lever means pivoted to the free end of one of said arms, means for causing one end of said lever means to be in reactive relation with the spring means, means for connecting the other end of said lever means to one of the relatively movable elements of said actuating means, means operating in connection with one of said arms to balance the moment produced by the weight of said actuating means, and connection means upon the free end of said auxiliary arm to connect the same with the rest of the brake.

18. In a friction brake, a brake shoe arranged to engage the periphery of a brakedrum, a frame, oscillating means supported by said frame, means for supporting said brake shoe from said oscillating means, and at least one operating means including actuable means arranged into a closed action-reaction circuit oscillatably mounted substantially at a nodal axis of said oscillating means to follow its movement and means for statically balancing said operating means including said actuating means about said nodal axis thereby to eliminate unbalanced moments.

19. In a friction brake for controlling the rotation of a brakedrum, a pair of brake shoes arranged to engage said brakedrum at opposite sides thereof, a frame, means pivotally mounted upon said frame for supporting said brake shoes, spring means for controlling the pressure of said brake shoes against the brake wheel, and at least one system comprising solenoid and lever means pivotally interassociated into a closed mechanical linkage pivotally mounted in operating relation with said brake shoes for overcoming said spring means, static balancing means for statically balancing said system about its pivotal mounting for preventing unbalanced moments from affecting the equilibrium of the brake.

20. An operating mechanism for controlling the engagement of a frictional element with a rotatable member, comprising an auxiliary arm pivotally mounted adjacent to and in operative relation with said frictional element, spring means for biasing said frictional elements with relation to said rotatable member mounted upon the free end of said auxiliary arm, a lever system, and actuating means for counteracting said spring means through the intermediary of said lever system, said actuating means being arranged into a closed action-reaction circuit, static balancing means for statically balancing said actuating means so as to be free from external reactions injurious to the operation of the brake.

21. An operating mechanism for operating the brake shoes of a friction brake comprising a base, a shoe arm pivotable at one end to said base, a brake shoe mounted upon said shoe arm, actuating means having a movable element mounted upon said shoe arm, means for balancing the moment produced by said actuating means mounted upon said shoe arm, a bell crank pivotally connected to the free end of said shoe arm, means for connecting said bell crank to the movable element of said actuating means, and means for transmitting a relative motion of said bell crank to said brake shoe.

22. An operating unit for a friction brake comprising a shoe arm and an auxiliary arm, means for pivotally supporting in substantially coaxial relationship said arms at adjacent ends thereof, actuating means supported on said auxiliary arm having relatively movable elements, means for balancing the moment produced by the weight of said actuating means, spring means for clamping together the free ends of said arms, lever means having one end pivoted at the free end of one of the said arms, one end of said lever means being in reactive relation to said spring means and means for connecting the other end of said lever means to said actuating means for varying the action of said spring means upon said arms.

23. For controlling the engagement of frictional elements with a rotatable member of a friction brake, an arm, an operating mechanism mounted upon said arm and in operating relation with said frictional elements, means for pivotally supporting said arm adjacent to a nodal axis of said frictional elements, and means for balancing the operating mechanism with respect to the rest of the brake about the pivotal axis of the arm to eliminate the effects of unbalanced moments upon the operation of said brake.

24. In a friction brake having a base and a pair of frictional elements pivotally mounted upon said base and capable of being moved into braking engagement with a brakedrum to be controlled, an auxiliary arm pivotally mounted adjacent to and in operating relation with said frictional elements, an operating mechanism for operating said frictional elements mounted upon said auxiliary arms, means for supporting said operating mechanism combined with said frictional elements in a manner so as to be free from external reactions and means for statically balancing said operating mechanism about the pivotal axis of said auxiliary arm.

25. In a friction brake, a brakedrum, a base, a pair of frictional elements pivotally mounted to said base and capable of being urged into braking relation with said brakedrum, an operating mechanism for operating said frictional elements, an auxiliary arm, pivotally mounted adjacent to and in operating relation with said frictional elements, said operating mechanism being supported on said auxiliary arm, means for statically balancing said operating mechanism by itself and in combination with said frictional elements so as to be free from external reactions.

26. An operating unit to operate the brake shoes of a friction brake, comprising a shoe arm and an auxiliary arm, means for pivotally supporting said shoe arm and auxiliary arm at one end in substantially coaxial relationship, a brake shoe supported on said shoe arm, a first electromagnetic actuating means having relatively movable elements mounted on one of said arms, spring means effectively biasing said brake shoe in a predetermined direction, means for connecting one of the relatively movable elements of said actuating means to oppose said spring means when said first electromagnetic actuating means is energized, and means including a second electromagnetic actuating means for balancing the moment produced by the weight of said first electromagnetic actuating means, one of said electromagnetic means being removable for repair or replacement purposes without impairing the operation of said friction brake.

27. A friction brake, comprising a brakedrum, a shoe arm, a base, an auxiliary arm, means for pivotally supporting said shoe arm and auxiliary arm from said base, a brake shoe supported on said shoe arm, a first electromagnetic actuating means having relatively movable elements, spring means effectively biasing said brake shoe in a predetermined direction, means for connecting one of the relatively movable elements of said actuating means to oppose said spring means in response to energization of said first electromagnetic actuating means, and means including a second electromagnetic actuating means for balancing the moment produced by the weight of said first electromagnetic actuating means, either of said electromagnetic means alone being capable of operating said brake.

28. A friction brake, comprising a base, a brake drum, a torque absorbing system comprising two brake shoes capable of frictionally engaging said brake drum and a pair of nodal axes, means mounted upon said base for supporting said brake shoes, torque adjusting means biasing said brake shoes in a predetermined direction, a first torque controlling system oscillatably mounted substantially coaxial with one of said two nodal axes of the torque absorbing system, a second torque controlling system oscillatably mounted substantially coaxial with the other of said nodal axes, the unbalanced moments of each of the two torque controlling systems being of opposite direction and of substantially equal magnitude thus substantially neutralizing each other, each torque controlling system being of sufficient capacity to move said brake shoes without the cooperation of the other torque controlling system, the relation of the two torque controlling systems to the brake being such that the operating means of either system may be removed without impairing the operation of said brake by the operating means of the other torque controlling system, and means such as a dummy weight for neutralizing the unbalanced moments occasioned by removal of one of said operating means.

29. A friction brake comprising a brakedrum, a pair of brake shoes capable of frictionally engaging said brakedrum, means for supporting said brake shoes on opposite sides of said drum, a first electromagnetic control system for causing relative movement between said brake shoes and said drum, a second electromagnetic control system substantially identical with said first control system for causing relative movement between said brake shoes and said drum, either of said two control systems being capable of operating said brake independently of the other system, said substantially identical electromagnetic control systems tending to neutralize any unbalanced moments produced by each alone.

30. In a friction brake, the combination of a brake drum, a brake shoe frictionally engageable with said drum, a base, a lever mechanism pivotally connected to said base including at least one member having one end thereof pivoted to said base, means for pivotally supporting said brake shoe from said lever mechanism whereby pivotal movement of said lever mechanism causes movement of said brake shoe in one of two directions either toward or away from said brake drum, means for biasing said lever mechanism in a manner to cause said brake shoe to move in one of said two directions, motive means operatively connected to said lever mechanism and effective when actuated to cause said brake shoe to move in the other of said two directions against the force of said biasing means, means for supporting said motive means on said member, and static balancing means for said lever mechanism, said brake shoe and said motive means for preventing any reaction between said brake shoe and said drum when said brake shoe is in a released position.

31. The combination of claim 30 wherein said motive means comprises an electromagnet.

References Cited in the file of this patent

UNITED STATES PATENTS

| Number | Name | Date |
|---|---|---|
| 750,283 | Hoover et al. | Jan. 26, 1904 |
| 960,055 | Sundh | May 31, 1910 |
| 1,231,590 | Friedlaender | July 3, 1917 |
| 1,334,774 | McLain | Mar. 23, 1920 |
| 1,455,895 | Thurston | May 22, 1923 |
| 1,474,960 | Fernow | Nov. 20, 1923 |
| 1,563,544 | Atkinson | Dec. 1, 1925 |
| 1,566,485 | Lautrup | Dec. 22, 1925 |
| 1,672,314 | Hall | June 5, 1928 |
| 1,852,857 | Price | Apr. 5, 1932 |
| 2,314,451 | Lillquist | Mar. 23, 1943 |